(12) United States Patent
Dutta et al.

(10) Patent No.: US 8,504,488 B2
(45) Date of Patent: Aug. 6, 2013

(54) NETWORK DATA MINING TO DETERMINE USER INTEREST

(75) Inventors: Debojyoti Dutta, Santa Clara, CA (US); Wei-Jen Hsu, Gainesville, FL (US); Gopal Dommety, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 895 days.

(21) Appl. No.: 12/112,456

(22) Filed: Apr. 30, 2008

(65) Prior Publication Data

US 2009/0276377 A1   Nov. 5, 2009

(51) Int. Cl.
*G06N 5/02* (2006.01)

(52) U.S. Cl.
CPC ..................... *G06N 5/022* (2013.01)
USPC .......................................................... 706/12

(58) Field of Classification Search
None
See application file for complete search history.

(56) References Cited

U.S. PATENT DOCUMENTS

| | | | | |
|---|---|---|---|---|
| 6,892,237 | B1 * | 5/2005 | Gai et al. | 709/224 |
| 7,099,867 | B2 * | 8/2006 | Okada et al. | 1/1 |
| 7,287,064 | B1 * | 10/2007 | Haldar et al. | 709/217 |
| 2006/0072595 | A1 | 4/2006 | Broberg et al. | |
| 2010/0280892 | A1 * | 11/2010 | Uzunalioglu et al. | 705/14.13 |

OTHER PUBLICATIONS

Kumar et al.; "Algorithms to Accelerate Multiple Regular Expressions Matching for Deep Packet Inspection"; 2006; SIGCOMM '06 Proceedings of the 2006 conference on Applications, technologies, architectures, and protocols for computer communications; pp. 339-350.*
Crabtree, I. Barry, et al.; "Identifying and tracking changing interests"; 1998; Springer-Verlag; Digital Libraries; pp. 1-16.*
Dharmapurikar, et al. Deep Packet Inspection using Parallel Bloom Filters. http://www.arl.wustl.edu/arl/projects/fpx. Last accessed Jul. 29, 2008.
Frenzel. Deep Packet Inspection at 20 Gbits/s Improves Networking Monitoring and Control. Aug. 16, 2007. http://electronicdesign.com/Articles/Print.crm?AD=1&ArticleID=16255.
CPacket. Beyond Deep Packet Inspection: New Chip First to Perform "Complete" Packet Inspection, at Wire Speeds to 20GBPS and Beyond. May 14, 2007. http://www.cpacket.com/.

* cited by examiner

*Primary Examiner* — Jeffrey A. Gaffin
*Assistant Examiner* — Stanley K Hill
(74) *Attorney, Agent, or Firm* — Schwegman, Lundberg & Woessner, P.A.

(57) ABSTRACT

Mining information from network data traffic to determine interests of online network users is provided herein. A data packet received at a network interface device can be accessed and inspected at line rate speeds. Source or addressing information in the data packet can be extracted to identify an initiating and/or receiving device. The packet can be inspected to identify occurrences of keywords or data features related with one or more subject matters. A vector can be defined for a network device that indicates a relative rank of interest in various subject matters. Furthermore, statistical analysis can be implemented on data stored in one or more interest vectors to determine information pertinent to network user interests. The information can facilitate providing value-added products or services to network users.

26 Claims, 11 Drawing Sheets

NETWORK DATA MINING TO DETERMINE USER INTEREST

BACKGROUND

Network service providers, such as web sites, search engines, online storage entities, etc., as well as online vendors attempt to track activity of communication device users to better understand their desires. If a service provider or vendor has no information about a user's desires or interests, product/service information, advertisements, or the like, directed to such a user may go unnoticed. Sending such information can often involve a cost for the vendor/provider, or can simply lead to a user ignoring the vendor/provider's information as spam.

In contrast, where an entity can provide information that matches an interest of a user, the user can be more predisposed to absorb the information. An understanding of a user's desires or interests therefore can provide a marketing edge in commerce, for instance, reducing costs or increasing business. However, many service providers may not have a sufficient means to interface with users to determine their interests. Further, popular online entities, such as search engines, social networking sites, and the like, which have a large draw for network users, can have a significant competitive edge over a web newcomer. Although large data networks such as the Internet provide a great potential for commerce, the newcomer might have a significant startup cost in providing a valuable service due to lack of online notoriety. Accordingly, additional steps are often necessary to turn potential online commerce into real business.

Even large network entities, such as a popular search engine, only have a limited interaction with users. Because networks can be so diverse, providing online access to large numbers of competitive entities, a market share of users is typically split amongst many different entities. Further, users often utilize online sites according to functions provided by those sites. Therefore, a search engine may have information about user searches, but it may not have much information about purchasing trends. Likewise, although an online retail store may have information about purchasing trends in products sold by such store, the online store might not have much information pertaining to a new product line being offered. Due to the functional nature of online vendors, marketers, product and service suppliers, and the like, interactions with network users are often fragmented according to particular subjects of interest and market shares held by existing online entities. Accordingly, additional steps are often necessary to provide integrated user interests spanning a diverse range of subject matter.

DESCRIPTION

Overview

Figure 1:
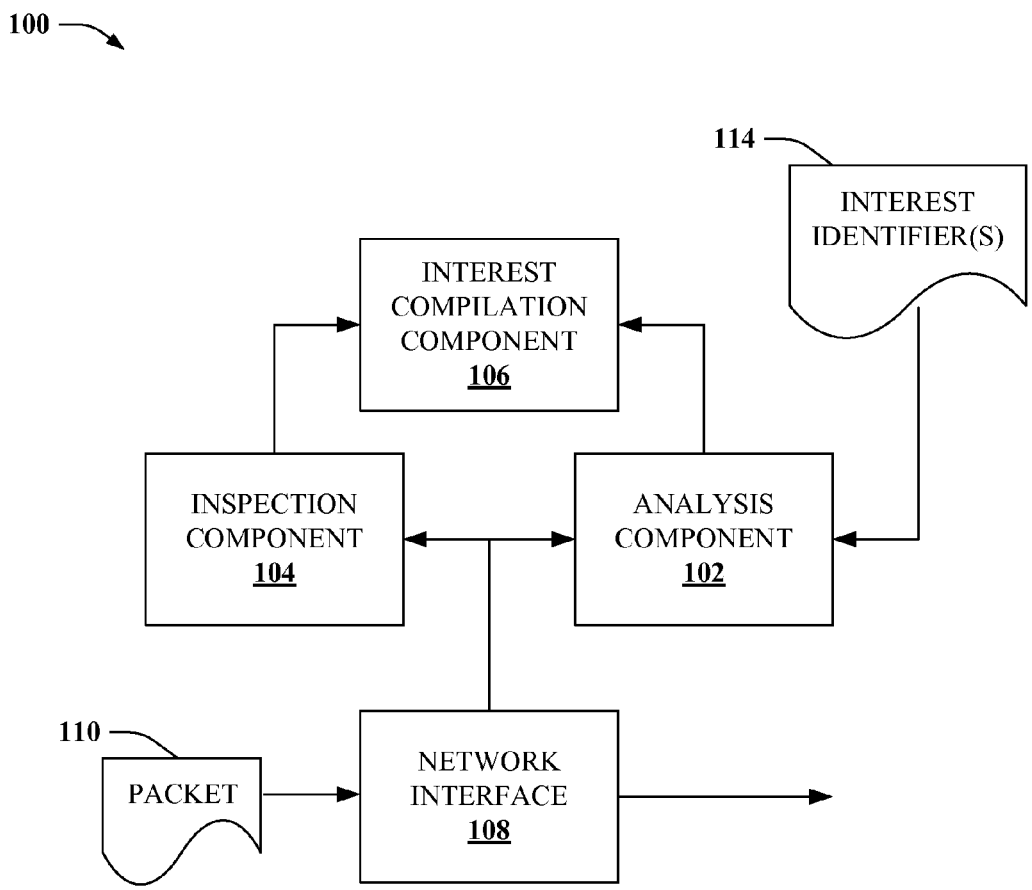
FIG. 1 depicts a block diagram of an example system that interacts with network traffic at common interface devices to determine network user interests.

The following presents a simplified overview in order to provide a basic understanding of some aspects of the claimed subject matter. This overview is not an extensive overview. It is not intended to identify key/critical elements or to delineate the scope of the claimed subject matter. Its sole purpose is to present some concepts in a simplified form as a prelude to the more detailed description that is presented later.

The subject disclosure provides for mining information from network data traffic to determine interests of online network users. A data packet received at a network interface device, routing device or other intermediary device can be inspected at substantially line rate speeds. Source or addressing information in the data packet can be accessed, copied, extracted, etc., to identify an initiating and/or receiving device. The packet can be inspected to identify occurrences of an interest identifier (e.g., a keyword, a feature of data, such as a pattern of text or media data, etc.) pertinent to a subject matter, topic of interest, or the like. Matching such an interest identifier to data within the data packet can result in incrementing an occurrence value associated with the subject/topic. The occurrence value can be maintained in memory (e.g., by a counter). Accordingly, as one or more interest identifiers pertaining to one or more subject matters are identified, a level of interest in the subjects/topics can be inferred. Such information can be utilized to increase value of targeted advertisement distributed to network users.

In some aspects, information collected at a network device can be output for consumption. For instance, an online entity could initiate a query to receive information collected about interests of network users. Updated user interest information can be provided in response to the query. Accordingly, targeted advertising or social networking can be conducted utilizing up-to-date user interest information based on a broad spectrum of a user's traffic (e.g., received at a network switch).

According to additional aspects, tracking changes in user interests as a function of time is provided. A time stamp can be recorded each time a data packet/interest identifier match is determined. Analyzing recorded time stamps enables tracking a frequency of interest identifier occurrence over time. Accordingly, a frequency of interest in one or more subject matters can be estimated. In addition, trends in user interests can be estimated according to changes in the frequency of interest. Such trends can be categorized as a function of time of year, time of day, day of a week, and so on. Thus, information pertaining to current user interests, previous user interests, and changes in such interests can be determined.

In one or more further aspects, network device users can be aggregated according to like subjects or topics of interest. Statistical algorithms can be utilized to analyze user interests, changes in such interests, frequencies of such changes, or the like. The analyzed user interest information can establish criteria for grouping device users together based in part on determined interests. For instance, a popularity of one or more subject matters can be determined based on numbers of users having a threshold interest in the subject matter(s). In addition, real-time advertising, marketing, etc., can be directed to particular users at a point in time when such users are actively expressing an interest in a particular subject. Such information can prove valuable to online vendors or suppliers to increase consumption of online marketing or advertisement information.

In accordance with still other aspects, machine learning can be employed to deconstruct various interests associated with a single device to identify interests associated with individual users (e.g., where multiple users can utilize a common networked device, or multiple devices can utilize a common local area network router, etc.). Typically, data packets transmitted by a router or device might only carry information about the transmitting device (at least in a header of such packets) resulting in potential convolution of distinct interests of multiple users. By employing various machine learning techniques, user interests can be deconstructed, optionally as a function of time, frequency of occurrence, commonality in subject matter, commonality in traffic or traffic type, or the like, to identify the interests of individual users. Accordingly, the subject disclosure can provide refined information pertaining to individual users, even when using a common device or network router.

The following description and the annexed drawings set forth in detail certain illustrative aspects of the claimed subject matter. These aspects are indicative, however, of but a few of the various ways in which the principles of the claimed subject matter can be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF EXAMPLE EMBODIMENTS

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "engine", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Remote network devices are communicatively coupled utilizing various electronic communication devices, routing components, interfaces and the like. Intermediary network devices, such as routers, switches, hubs, servers etc., typically reference certain information from the digital traffic in order to carry out their functions. For instance, a router could reference addressing information from digital traffic in order to route the traffic toward a desired destination device on a network.

Even in the simplest of networks, some type of routing device generally is responsible for delivering traffic from an initiating device to a target device. Accordingly, routing and other network interface devices interact with almost all traffic transmitted between network endpoints (e.g., personal computers, website servers, and so on). Providing for packet inspection at such devices, therefore, can generate a far greater range of information than packet inspection at the network endpoints themselves, such as at an online vendor's web site.

The subject disclosure provides for line rate data mining at network interface devices. Accordingly, a broad range of user data is accessible for refinement of user interest modules. One such module, as described in more detail below, is a user interest vector that provides an efficient namespace for associating an indication of user subject matter interest with a user's device. The result can be useful to provide value added services for network users.

Typically, online vendors, product or service suppliers, marketing entities and the like desire to understand interests of online users in order to direct commercial opportunities to interested entities. Such suppliers often track and research data that is sent to their network websites. For instance, a search engine web site could track searches and domain name server (DNS) queries to determine interests of those utilizing their search site. Likewise, an online retailer could track interactions with their sites; products that online users browse, information requested, products/services purchased, etc., can be referenced to infer user interests. Each of these entities can determine some information about users that visit their sites, but are often limited to such users that first target the supplier's site. In addition, such suppliers might have difficulty in determining interests of users not already serviced by their site. For instance, the online vendor might not have access to a user's search information input into or returned by a search engine.

Network interface devices, such as routers, switches, hubs, and like intermediary devices that facilitate transfer of traffic on a data network (e.g., the Internet) interact with a much broader spectrum of traffic than a server or even a search engine. In addition, such interface devices are not limited to traffic of a particular function, purpose or interest. Instead, most if not all traffic originated or destined to a user's network device (e.g., personal computer) will encounter an interface device that services the user device. Accordingly, monitoring traffic at the interface device can provide a greater degree of information, of varying user interests and pertaining to various subject matters, than available at a network endpoint (e.g., a website).

To monitor user data at such locations, fast packet inspection algorithms are employed to inspect data at line speeds. Information associated with a source or destination of the packet is accessed and used to identify an endpoint device (e.g., a network user's home or office computer). As an example, an Internet Protocol (IP) address or a media access control (MAC) address contained within a data packet can be utilized to identify a network device, since MAC addresses and IP addresses are typically unique to a particular device (or, e.g., group of devices served by a local routing device, such as a local area network [LAN] router).

In addition to the foregoing, subject matters of interest are defined and are associated with one or more interest identifiers that can provide some indication of an interest in an associated subject matter(s). An interest identifier, as used herein, can comprise a keyword, text, a data string, a tag, or a data feature, or a combination thereof or of the like, that can provide a textual, linguistic, and/or programmatic inference to a subject matter. A data feature, as utilized herein, can include distinguishable patterns of data, patterns of keywords, a type of language associated with text, a type of file or application associated with data, and so on. In some aspects, data features can pertain to media information, such as video, audio, photograph, or combinations thereof. In such aspects, media recognition algorithms can be employed to infer a subject matter or topic of interest pertinent to the media information. In other aspects, plug-in algorithms can convert media files to text, and infer subjects or topics pertaining to the media information from the text (e.g., keywords, patterns, tags, etc. associated with a subject or topic).

According to some aspects of the disclosure, line-rate deep packet inspection can be employed at the network interface device to inspect information contained within a data packet. The inspection can include a comparison of data within the data packet to one or more interest identifiers (e.g., keywords) to determine whether at least a portion of the data matches an interest identifier(s). A number of times that a match is determined can be recorded in memory (e.g., bit, group of bits, counter, etc.) and associated with subject matter assigned to the interest identifier(s). A relative ranking of a user's interest in the subject matter can be inferred at least in part from a number of interest identifier matches associated with the subject matter.

According to some aspects, a user interest vector is defined for each distinct source or addressing information (e.g., each IP address, each MAC address, and so on) extracted from inspected data packets. As additional packets including a particular source or addressing information are identified, an associated user interest vector can be updated based on information contained in such additional packets. For instance, data within such additional packets that match an interest identifier(s) associated with the above subject matter can be tracked. Additional identified matches are updated in memory (e.g., a counter) and the updated number of times a subject matter match is determined is utilized to infer an updated user interest in the subject matter.

In addition to the foregoing, the subject disclosure provides for time and frequency based determinations associated with matching data within data packets to subject matter interest identifiers. Specifically, a time stamp can be determined in conjunction with identifying/updating a number of interest identifier matches. Accordingly, user interest can be tracked over time. By determining frequency of matches, rate of change in frequency of matches, and so on, various time-based statistics associated with user online interests can be determined.

In at least one aspect, user interest vectors associated with multiple devices can be statistically grouped as a function of subject matter, associations between identified subject matter interests and/or degrees of such interests, time-based statistics, and so on. A vendor that desires to market a product to a group of individuals sharing a threshold interest in a particular subject matter, for example, could be provided contact information (e.g., source and/or addressing information, such as IP address) for such individuals (or, e.g., online devices thereof). As an example, a vendor selling footballs online could identify user interests related to sports and market their footballs to such users.

Thus, in contrast to conventional data tracking conducted at network end-points, the subject disclosure provides access to a much more diverse pool of information by employing packet inspection at network interface devices (e.g., routers, switches, hubs). Further, the subject disclosure utilizes an efficient namespace to infer interests by matching interest identifiers (e.g., data features) representative of a subject of interest to data packets received at the interface device, and tracking a number/frequency, etc., of matches. Statistical analysis is provided to determine changes in interest, frequency of such changes, and other time-based trends such as daily interest(s), weekly interest(s), monthly interest(s), and so on. Furthermore, by grouping individuals as a function of like interests or degrees of such interests, vendors can target individuals more likely to consume information associated with a subject of interest. As another example, social networking entities can better determine groups of individuals likely to share a common interest. Accordingly, the subject disclosure provides a significant advantage for targeted online advertising, social networking, or the like.

As described herein, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Further, as used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described herein.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a block diagram of an example system 100 that provides inspection of data packets (110) encountered at a network interface device 108 (e.g., switch, router, hub) to determine interests of online users. System 100 can employ deep packet inspection substantially at data packet line rates to determine the interests while mitigating loss of throughput as a result of such inspection. Accordingly, system 100 can improve accuracy of targeted advertising and/or social networking information by accessing a large degree of traffic associated with networked computing devices.

System 100 can include an analysis component 102 that extracts source, target and/or addressing information from a data packet 110 received at the network interface component 108. Such interface component 108 can be a data network device that facilitates network traffic handling. For instance, the interface component 108 can comprise a switch, router, hub, or a combination thereof or of the like.

Analysis component 102 can inspect information contained within the data packet 110 (e.g., a header, payload and/or trailer of the data packet 110) as the packet 110 is handled by the interface device 108. As one example, analysis component 102 can identify a source IP address, a source MAC address, or like information identifying a device that transmitted the data packet 110. As another example, analysis component 102 can identify destination information, such as a target IP address or target MAC address, or like information identifying a target of the data packet 110. In yet another example, analysis component 102 can identify addressing information sent to an intermediary networking device (e.g., a local area network router) coupled to a transmitting device or target device. Source and/or addressing information can be extracted, copied, etc., from the data packet 110 by analysis component 102 and forwarded to interest compilation component 106.

System 100 can also include an inspection component 104 that matches data within the data packet 110 (e.g., within a payload of the data packet 110) to one or more interest identifiers 114. The interest identifier(s) 114 can comprise text, keywords, tags, or data features, or a combination thereof or of the like (referred hereinafter collectively as interest identifiers) 114. Furthermore, each interest identifier 114 can be associated with a subject matter or subject of interest. For example, interest identifiers associated with the subject matter 'sports' could include keywords such as 'baseball', 'football', 'basketball', or other names of sports, 'espn', 'score', 'playoff', 'game', a name of an arena or field, and so on. Repetition of the word 'basket', with or without 'ball' (e.g., a data feature), could be associated more with a different subject (e.g., weaving, textiles, manufacturing, etc.), as opposed to sports. It should be appreciated that an interest identifier 114 could be associated with multiple subject matters. However, a subject matter typically will not be associated with an identical set of interest identifiers (114) as another subject matter (e.g., a set of interest identifiers [114] associated with a first subject matter will be different than a set of interest identifiers associated with a second subject matter).

Upon matching an interest identifier 114 to at least a portion of data within data packet 110, analysis component 102 can update an occurrence value assigned to a subject matter(s) associated with the interest identifier 114. The occurrence value can be maintained in a counter (e.g., memory bit, byte, word, etc.). For instance, continuing the above example, if an occurrence of a keyword 'football' is detected within data packet 110, an occurrence value and/or counter assigned to subject matter 'sports' can be incremented by one.

In some aspects, a counter assigned to each interest identifier 114 can also be maintained by system 100. In such instances, analysis component 102 can update an occurrence value of the interest identifier counter, as well as a subject matter counter associated with the interest identifier 114, upon matching the interest identifier 114 to data within a data packet 110. Subject matter counter information (and, e.g., keyword counter information in some aspects) can be provided to interest compilation component 106 for further analysis.

It should be appreciated that system 100 can employ various algorithms for matching interest identifiers (114) with information contained in a data packet (110). For instance, to match an interest identifier (114) to a string in the data packet 110 (e.g., in conjunction with identifying source or addressing information), an Aho-Corasick algorithm can be employed. Further, to capture a packet and/or determine a data match a libpcap or like algorithm can be employed. It should be appreciated, however, that such algorithms are examples only; the subject disclosure is not limited to use of such algorithms to inspect a data packet (110) and identify information therein as described by the subject disclosure. Instead, other algorithms described herein or known in the art can be employed in lieu of or in addition to the algorithms articulated above.

Interest compilation component 106 can define a user interest vector for each unique source or addressing information identified by inspection component 104. In some aspects, the source or addressing information is included in the user interest vector to associate the user interest vector with one or more related devices (e.g., transmitting device, target device). In some aspects, the source or addressing information can be truncated, transformed, or the like. For instance, a hash function can be utilized to modify the source or addressing information. Information modified in this manner can provide security, mitigating a likelihood of unauthorized access to or use of such information (e.g., since modified source or addressing information typically is not suitable to directly communicate with a device). In addition, modification of the source or addressing information can reduce memory requirements involved in storing the user interest vector.

In addition to the foregoing, interest compilation component 106 can include subject matter and/or keyword counter information (e.g., occurrence values) within a user interest vector. For instance, a number of occurrences of a keyword or a number of occurrences of keywords associated with a subject matter (e.g., sports) can be stored in memory associated with the user interest vector. Accordingly, a measure of interest (e.g., inferred from an updated value of a counter) in the subject matter can be linked to a networked device utilized to transmit or receive information pertaining to the subject matter (e.g., identified by the source or addressing information). Compilation component 106 can associate multiple subject matter/keyword counters with a user interest vector, enabling a device (and one or more corresponding users) to be associated with multiple subject matters. By employing a unique set of interest identifiers for each subject matter, determining a number of data matches pertaining to each set and associating the determined numbers with the user interest vector, the vector can provide a relative level of interest in each of the multiple subject matters (e.g., see FIG. 3, infra).

According to additional aspects, compilation component 106 can define a user interest vector for multiple distinct network devices (e.g., distinguished by unique source or addressing information). Such an interest vector can be used to compile and/or distinguish subject matter interest information associated with distinct network devices of a user (e.g., home device, work device). Accordingly, where a user's interest changes as a function of a networked device, targeted advertisement can be sent to a device from which a user most often expresses an interest in a subject pertinent to the advertisement.

According to at least one other aspect, multiple user interest vectors can be generated by interest compilation component 106 for a single device (e.g., identified by IP address, MAC address, or the like), or for a user of the device (e.g., identified by a name included within a data packet originated at or terminated at the device, or an aggregation of common interests identified within a user interest vector as described herein, statistical analysis and/or machine learning as described herein or known in the art, etc.). In the latter case, the multiple vectors assigned to a common user can be distinguished based on one or more determinable criteria. For instance, distinct periods of time, variations in interest within a threshold time, distinct network devices utilized by the user, and so on, can be utilized to distinguish commonly assigned vectors.

As an example to illustrate the foregoing, a user interest vector can be assigned to a user for a particular period of a day (e.g., morning). Data packets (110) identified and associated with the user during the particular period can be associated with a first user interest vector, whereas data packets (110) identified and associated with the user during a different period of the day can be associated with a second user interest vector. As an additional example, data packets (110) associated with a particular user that originate from/terminate at a particular device can be assigned to one user interest vector, and data packets (110) associated with the particular user that originate from/terminate at a different device can be assigned to another user interest vector. In such a manner, different interests maintained at different periods of time (e.g., morning v. evening) or at different devices (e.g., a home device v. an office or work device) can be distinguished. According to at least one aspect, an aggregated user interest vector can be maintained that tracks interests and degrees of interest, as described herein, for each of multiple interest vectors assigned to a user.

Figure 2:
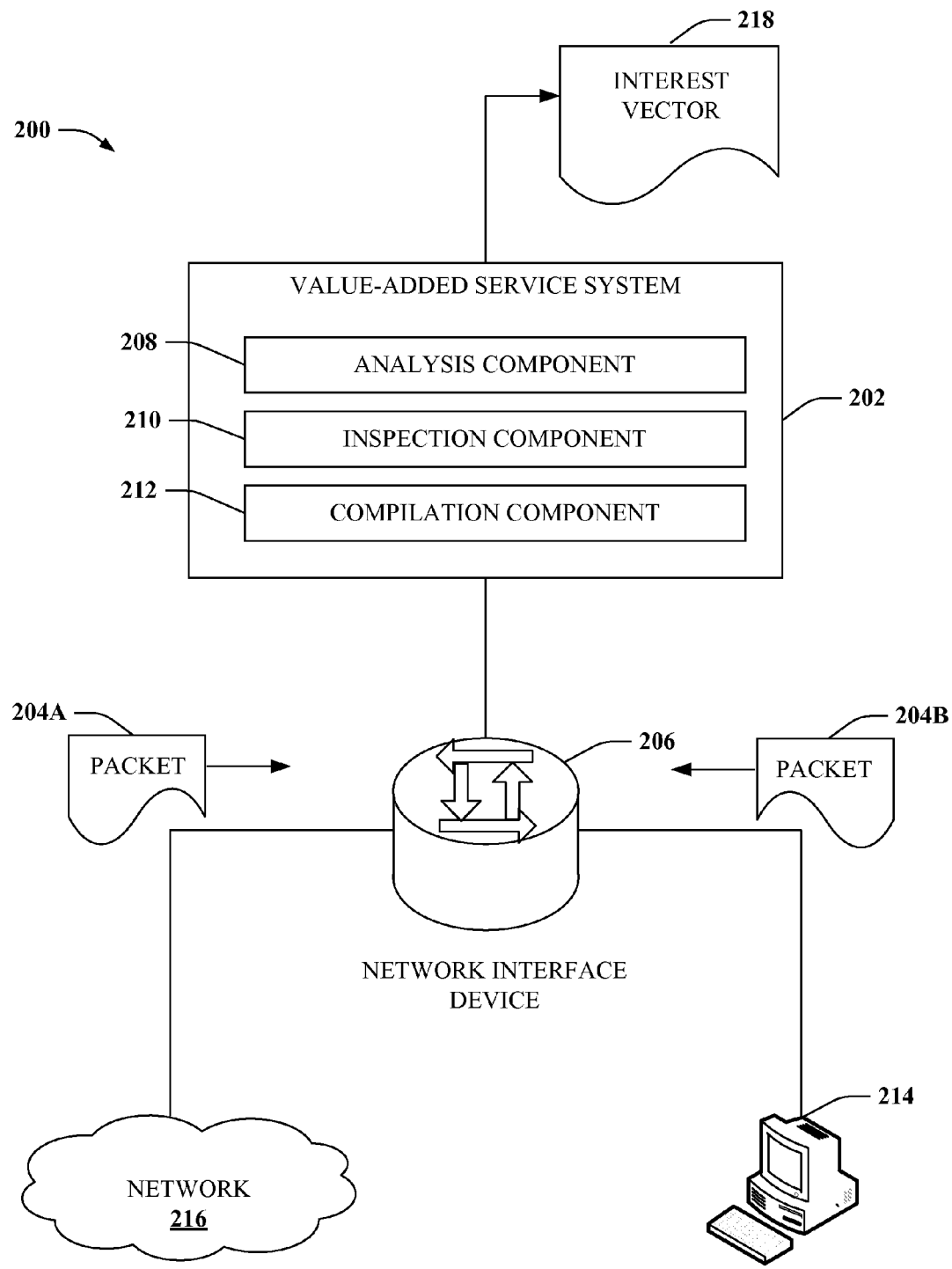
FIG. 2 depicts a block diagram of an example system that inspects packet flows to and from devices to mine data and identify various network user interests.

FIG. 2 depicts a block diagram of an example system 200 that provides value added services (202) by inspecting packet flows (204A, 204B) to and from devices (214). Data mining can be employed in conjunction with inspection to identify various network user interests. Further, system 200 can continuously monitor flows of data packets (204A, 204B) encountered at one or more network interface devices (206), such as a switch, to update existing interest information. Deep packet inspection substantially at line rate provides a mechanism to determine subjects of interest, which can be provided to vendors for targeted marketing and value-added services. Accordingly, system 200 provides a valuable service for online vendors and consumers alike.

System 200 can include a value-added service system 202 that accesses data packets 204A, 204B encountered at a network interface device 206. The network interface device 206 can be an edge device that provides access to a data network 216. For instance, the network interface device 206 can be a router, switch, hub, or like device of an Internet service provider (ISP), a hardware supplier (e.g., cable line supplier, digital subscriber line [DSL] provider, optical line provider), or of an administrative network (e.g., private intranet). Data packets 204A, 204B can be transmitted from a user device 214 to a network 216 or from the network 216 to the user device 214.

Value-added service system 202 can include components (208, 210, 212) that extract source or addressing information of a device 214 and perform packet inspection to match subject matter interest identifiers to information in a data packet 204A, 204B. In one aspect, the packet inspection matches text strings within the data packets 204A, 204B. Text strings can be associated with text transmitted by a user, or can be tags associated with application objects, or the like. For instance, a tag can be text associated with a picture, e-mail, video, audio, or like application. In additional aspects, an application-to-text translator, or like module, can be employed to convert media information (e.g., picture, video, audio) to text. Value-added service system 202 can then inspect the converted text to mine data from media applications included within data packets 204A, 204B. In other aspects, modules can be utilized to identify data features within the media itself (e.g., features of a song or other audio file, features of video media, features of a still-frame photograph, etc.). Such text, patterns, media features, and other data features can be utilized to infer a subject of interest from a data packet (204A, 204B). Information extracted from the data packets 204A, 204B can be compiled into a user interest vector 218 associated with the user device 214 (e.g., as a function of unique source or addressing information pertinent to the user device 214), as described herein.

User interest vector 218 can be updated by value-added service system 202 as additional data packets 204A, 204B are encountered at the network interface device 206. Accordingly, the user interest vector 218 can be refined over time to more accurately reflect interest(s) of a user(s) of the user device 214. For instance, as packets (204A, 204B) are inspected over time, additional subject matters and associated interest identifiers can be identified. User interest vector 218 can be updated with additional subject matter counters based on occurrences of interest identifiers associated with such additional subject matters.

As a particular example, if a first packet inspected (204A) includes data that matches interest identifiers assigned to three subject matters. Thus, interest vector 218 is initially defined to associate the three subject matters with the user device 214. The three subject matters also have occurrence values determined/updated each time an interest identifier match related to a respective subject matter is found. In addition, if a second packet (204B) is inspected, and interest identifiers associated with two additional subject matters are matched within the second packet (204B), user interest vector 218 can be updated to associate those additional subject matters with the user device 214. Further, the user vector can include occurrence counter values identifying a number of interest identifier matches associated with the new subject matters. Additionally, if data in the second packet (204B) matches interest identifier(s) associated with the first three subject matters, associated subject matter counters can be updated to reflect the additional matches. Accordingly, system 200 can refine user interest information over time as additional packets are inspected, providing greater statistical accuracy between interests identified by the interest vector 218 and interests of a user(s) of the user device 214.

Figure 3:
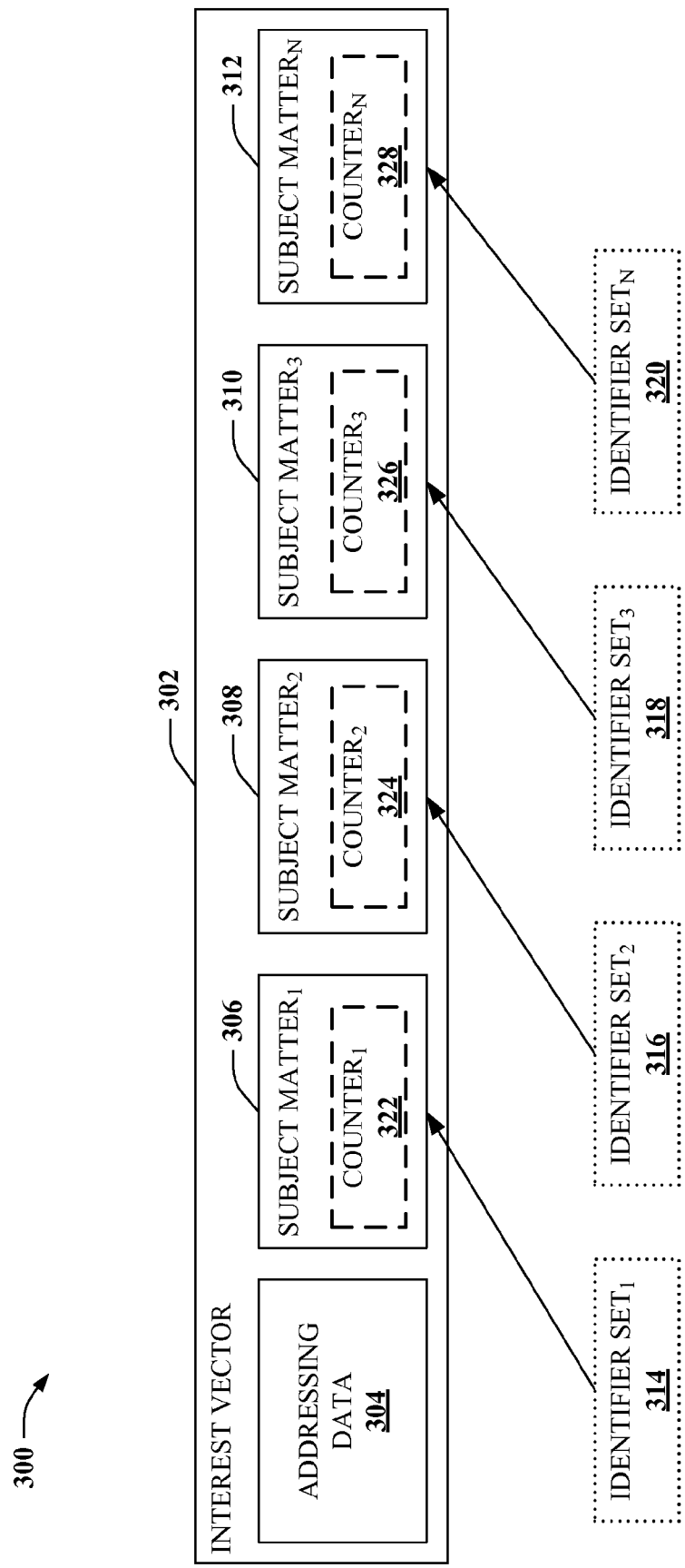
FIG. 3 illustrates a block diagram of an example user interest vector that identifies subject matter interests of a user and provides a relative rank of such interests.

FIG. 3 illustrates a block diagram 300 of an example user interest vector 300 that identifies a subject matter interest(s) of a user and provides a quantitative ranking of such interest(s). User interest vector 302 can provide subject matter information extracted from data packets having common source or addressing information. The source or addressing information can be utilized to link the user interest vector with a particular networked device (e.g., computer, laptop, LAN router, or the like). Additional subject matter information, contained within data packets having like source or addressing information, can be utilized to update and/or refine user interest vector 302. Accordingly, accuracy of the user interest vector and associated information can be statistically increased based on acquisition of additional data.

User interest vector 302 can include an ID block 304 that contains addressing data unique to a network device. The addressing data can comprise an IP address, MAC address, a combination thereof or of like information, or a modified version of such information (e.g., a hash of an IP address). In addition, user interest vector 302 includes one or more subject matter blocks 306, 308, 310, 312. Specifically, as depicted, subject matter block$_1$ 306, subject matter block$_2$ 308, subject matter block$_3$ 310 through subject matter block$_N$ 312 (where N is an integer greater than 0) can each contain information pertinent to a particular subject of interest. As one particular non-limiting example, subject matter block$_1$ 306 can pertain to sports, subject matter block$_2$ 308 can pertain to shopping, subject matter block$_3$ 310 can pertain to art and/or literature, and so on up through subject matter block$_N$ 312. It should be appreciated that any suitable subject matter can be associated with a subject matter block 306, 308, 310, 312. Further, a subject matter block 306, 308, 310, 312 can be a subset or superset of other subject matter blocks 306, 308, 310, 312. As another non-limiting example, subject matter block$_1$ 306 can pertain to sports whereas subject matter block$_2$ 308 can pertain to basketball.

Each subject matter block 306, 308, 310, 312 is assigned to one or more interest identifiers (314, 316, 318, 320). Sets of interest identifiers 314, 316, 318, 320 assigned to a subject matter block 306, 308, 310, 312 are selected so as to provide some relevance to the associated subject matter, as described herein. For instance, interest identifiers can be selected such that a definition, synonym, antonym, etc. of the interest identifier, or a pattern of text, a tag, or feature of media data, or some other suitable aspect of an interest identifier provides a description of, reference to and/or inference to the subject matter. Thus, occurrence of the interest identifier within network traffic can provide an inference that the traffic is related to a device user's interest in a subject matter associated with the interest identifier.

Occurrence within a data packet of one or more interest identifiers of a set of interest identifiers 314, 316, 318, 320 can result in incrementing an occurrence value maintained by a counter 322, 324, 326, 328. Such a counter 322, 324, 326, 328 is correlated to a subject matter (322, 324, 326, 328) assigned to the interest identifier set 314, 316, 318, 320. Relationships between counter 322, 324, 326, 328 occurrence values can provide a relative degree of interest in associated subject matters. For instance, a large counter 322, 324, 326, 328 occurrence value can indicate a greater interest in an associated subject matter than a smaller counter 322, 324, 326, 328 occurrence value.

Interest vector 302 can be stored at a value-added system component as described herein. Because an interest vector 302 has unique addressing information (304), the interest vector 302 can be indicative of interests of a particular network device user (or, e.g., a group of users utilizing a common network device). Interest vectors (302) associated with different users/devices can be compared to determine interests of one user compared with interests of other users. In some aspects, users can be grouped based on relationships identified between interest vectors 302. For instance, if subject matter blocks 322, 324, 326, 328 of two interest vectors (302) pertaining to similar subjects have relatively large occurrence values (e.g., with respect to occurrence values of other subjects) the two interest vectors can be grouped at least with respect to the similar subjects. Such groups can be indicative of network users who share a common interest(s).

According to further aspects, occurrence values can be adjusted as a function of time. For instance, after a threshold time passes, a value of each counter 322, 324, 326, 328 can be reduced, decremented, etc. to give a higher relative weight to recent interest identifier matches. Thus, higher counter 322, 324, 326, 328 occurrence values can indicate contemporary interests in addition to degrees of interest. Accordingly, an interest vector 302 can provide substantial data pertaining to user interests and how such interests might change over time.

Figure 4:
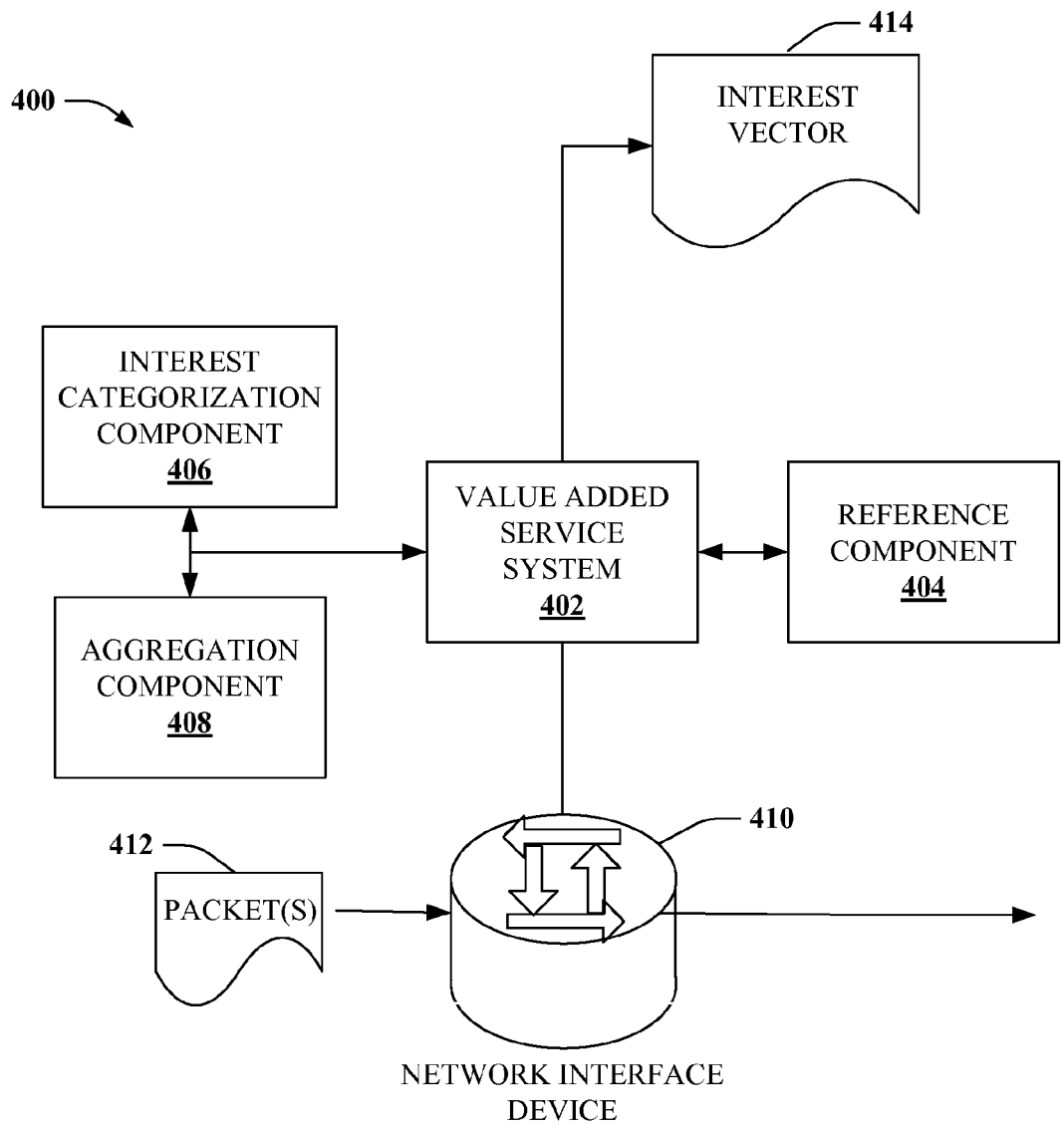
FIG. 4 depicts a block diagram of an example system that determines online interests of various users and aggregates users into groups of common interest.

FIG. 4 depicts a block diagram of an example system 400 that determines online interests of various users and aggregates users into groups of common interest. Interests can be identified based on information contained in network data packets (412) encountered at a network interface device 410 as described herein. By identifying groups of users linked by common interests, additional value can be provided to online suppliers, marketing entities and the like by increasing a market of users having a potential interest in products or services of such suppliers.

System 400 can include a value added service system 402 that generates an interest vector 414 for various network devices/device users, as described herein. The interest vector(s) 414 can be populated with information pertaining to identified interest identifiers and subject matters. In one particular aspect, system 400 can include a reference component 404 that provides a diverse mechanism to collect user interest information. Specifically, reference component 404 can compile a list of synonyms or antonyms, or other words or phrases sharing a definition-related relationship with a subject matter interest identifier(s). In some embodiments, reference component 404 can utilize spell-check or spell correction algorithms to identify potential misspelled words within a data packet. A proposed corrected version of such words can be forwarded to value added service system 402.

In addition to inspecting a data packet 412 for interest identifiers, value added service system 402 can inspect the data packet 412 for interest identifier synonyms, antonyms and/or the like. Further, value added service system 402 can, in conjunction with reference component 404, inspect the data packet for misspelled variations of such interest identifiers or interest identifier synonyms or antonyms. According to further aspects, value added service system 402 can update a subject matter counter contained within the interest vector 414 upon matching data within the packet 412 to an interest identifier, synonym and/or antonym thereof, misspelled variation, etc., as suitable. Accordingly, the reference component 404 can provide a more flexible utilization of interest identifiers to identify subject matter interests within the data packet 412.

System 400 can further include an interest categorization component 406 that associates a general subject with one or more interest identifiers utilized by value added service system 402. The general subject can be related to a predetermined subject associated with such interest identifier. For instance, the general subject can be synonymous with the predetermined subject (e.g., sports and athletics), an antonym of the predetermined subject (e.g., shopping and sales), and so on. In some aspects, the general subject can be a superset of the predetermined subject (e.g., sports as to hockey, United States politics as to Democratic Party Congressional candidates, and so on). Interest vector 414 can be updated such that a counter associated with the predetermined subject is updated when an interest identifier associated with the general subject is identified in the data packet 412. Alternatively, or in addition, an additional subject matter block and assigned counter can be included within the interest vector 414 pertaining to the general subject. Accordingly, system 400 can dynamically update and expand a user interest vector 414 by expending upon predetermined subjects (e.g., provided by a vendor). A user's interest in the predetermined subject and/or general subject can be ranked based on values of the counters associated with such subjects, as described herein.

System 400 can also include an aggregation component 408 that analyzes relationships between multiple interest vectors 414. Based on such relationships, the aggregation component 408 can group or cluster interest vectors 414 into an interest or subject matter category. For instance, interest vectors having a relatively high counter value in a particular subject and/or related subjects (e.g., synonymous subjects) can form a cluster/group. The counter values can be analyzed with respect to subject matter counter values of other interest vectors 414, or subject matter counters of the same interest vector 414, or both. In one aspect, aggregation component 408 can define a multi-space matrix that plots relative positions of multiple user vectors as a function of subject matter counter values. Relationships between plot points on the matrix can be utilized to aggregate one or more user vectors as a function of subject of interest (e.g., based on proximity within the matrix to other user vector plot points). The matrix can be updated over time, wherein identified and/or ranked relationships can be re-evaluated to reflect present interests of the user vectors (e.g., see FIG. 3).

As one additional example, a subject matter having a highest counter value with respect to other subject matter counters of a common interest vector 414 can be identified as a dominant interest. Further, the dominant interest can be ranked relative to other interests based on a ratio of subject matter counter values of an interest vector 414. Aggregation component 408 can compare the dominant subject matters of various interest vectors 414 and cluster interest vectors according to dominant subject matter. Likewise, interest vectors with common or similar moderate or low ranked subject matters can be clustered, and so on. In one aspect, a K-means algorithm is utilized to determine relationships between subject matter counters of different interest vectors 414 and cluster the interest vectors accordingly.

As described, system 400 can provide flexible inspection and analysis of data packets (412) to identify user interests. Specifically, system 400 can dynamically adjust monitored subjects of interest and/or expand up (or, e.g., contract) a pool of interest identifiers used to identify and measure such subjects of interest. In addition, user interest vectors can be grouped according to similar or dissimilar interests. Accordingly, by identifying such groups, greater value can be provided to network vendors that market products, services, advertisements, etc. to network users.

Figure 5:
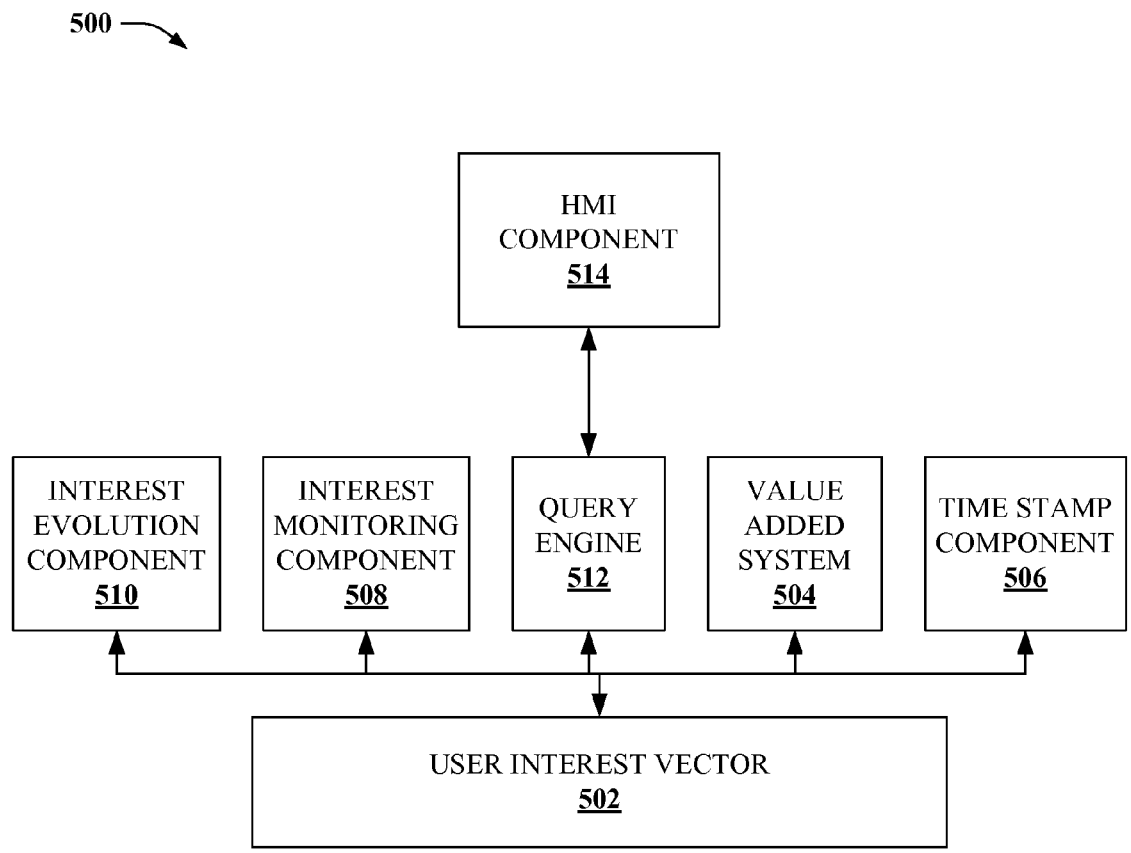
FIG. 5 illustrates a block diagram of a sample system that monitors user interest vectors over time and determines changes in user online interests.

FIG. 5 illustrates a block diagram of a sample system 500 that includes a value added service system 504 to define and update a user interest vector 502 based on changes in user online interests. User interest vector 502 is populated with subject matter information pertaining to network traffic initiated by or directed to a network device (e.g., a home or office computer, not depicted). The information can comprise an occurrence value(s) indicating a number of times an instance identifier associated with a subject matter(s) is identified within the network traffic. The quantitative aspect of such information can provide a relative scale of interest for the subject matter(s). In addition, system 500 can track changes in the relative scale of interest as a function of time. Accordingly, system 500 can identify and utilize time-based trends in user online interests.

System 506 can include a time stamp component 506 that records an update time for each instance that value added system 504 updates an occurrence value (e.g., maintained by a subject matter counter) associated with user interest vector 502 (e.g., when an interest indicator is matched to data within a data packet pertinent to the user interest vector 502). As an example to illustrate the foregoing, a time can be determined (e.g., 09:05:35, in hours, minutes and seconds) when a subject matter counter is first incremented (e.g., a value of the subject matter counter is changed from zero to one). A time when the subject matter counter is next incremented can also be determined and recorded by time stamp component 506 (e.g., at 09:05:55). Recorded times can be saved within memory associated with subject matter blocks of the user interest vector 502. Accordingly, a time when a subject matter interest indicator (e.g., a keyword) is identified can be referenced, as well as time-based statistics, such as frequency of occurrence, changes in frequencies of occurrence over predetermined time thresholds, and so on.

In addition to the foregoing, a date (e.g., calendar date) can be recorded upon updating an occurrence value and/or subject matter counter based on occurrence of a subject matter interest identifier in a data packet. Recorded date can be in addition to recorded time (or, e.g., in lieu of recorded time in some aspects). The recorded data can be stored within a subject matter block of the user interest vector 502 that is related to the updated subject matter counter. Accordingly, calendar-based activity can be analyzed in conjunction with time-varying online interest trends. As an example, a degree of interest in one or more subject matters as a function of time of day, day of the week, week of the month, month of the year, and so on, can be determined.

Time-based user interest information can be leveraged by an interest monitoring component 508 to determine a current degree of online interest pertaining to one or more device users. As an example, the interest-monitoring component 508 can determine a frequency with which an occurrence value associated with a subject is updated. The degree of interest can then be ascertained based in part on the determined frequency. A current or contemporaneous online interest can then be determined based in part on a frequency with which a subject matter counter is updated at a recent point in time. For instance, if a number of updates of a subject matter counter substantially increases within a relatively short threshold period (e.g., within the previous 10 minutes), interest monitoring component 508 can infer that a user is currently interested in the subject matter. In one example, the threshold period can be relative to total time the subject matter is monitored, relative to update frequency periods of other subjects of interest contained within user interest vector 502, or of other user interest vectors (502), or the like. A magnitude of the update frequency can also be determined by interest monitoring component 508 for inferring a degree of the interest.

In addition to the foregoing, system 500 can include an interest evolution component 510 that can analyze changes in a determined update frequency provided by the interest monitoring component 508. Results of the analysis can be provided to the interest monitoring component 508 and employed in part to ascertain a degree of interest in a subject. Interest evolution component 510 can therefore assist in determining trends in increased or decreased user interest. Trends can be based on times of day, days of a week, etc., as described herein. Thus, increased user interest can be analyzed to determine whether a social trend is occurring or a trend particular to one or a small number of users. Accordingly, interest evolution component 510 can provide valuable information pertaining to communities of online users. For instance, user reaction to a popular sporting event can be determined contemporaneous with occurrences within the sporting event (e.g., based on a common or similar time of occurrence). In some aspects, user reaction to news reports and other mass media can be gauged.

Furthermore, interest monitoring component 510 can aggregate trends associated with one or more user vectors 502. In some aspects, one or more interests of a single user vector can be aggregated together. In other aspects, one or more interests of different user vectors can be aggregated together. In further aspects, a combination of the foregoing interests can be aggregated together.

Interest monitoring component 510 can aggregate interests by various logical and/or mathematical means. A relative ranking of one or more interests (e.g., with respect to other interests of a common user vector. or with respect to interests of a plurality of user vectors, or both) can be compared with relative rankings of other interests. In one example, interests ranked within a threshold range of each other can be aggregated together (e.g., interests within 5% of a particular relative rank). As a specific example, a dominant interest (e.g., having highest interest ranking for a particular user vector) can be aggregated with other dominant interests. In some aspects, dominant interests within a certain relative ranking (e.g., 5%) can be aggregated. In further aspects, interests within a certain relative ranking that are correlated by a common general subject (e.g., hockey and football can be correlated by a general subject 'sports') can be aggregated. It should be appreciated that various other factors can be utilized to provide aggregation of ranked interests, based in part for instance, on a number of identified interest identifiers associated with an interest or a ranking of the interest.

As described, system 500 can generate valuable information for online entities. According to additional aspects, system 500 can output such information, or statistical compilations thereof, via a query engine 512. Such a query engine 512 can be configured to receive a request for data (e.g., from a human machine interface [HMI] component 514, a server, a database, and so on). The query engine 512 can inspect the user interest vector 502 for the requested data or a portion thereof. If the data (or portion of the data) is contained within the user interest vector 502, or another user interest vector maintained by value added system 504, such data can be accessed, extracted, copied, and/or linked by the query engine 512. The data, link, access, etc., can be provided in a response to the request. It should be appreciated that HMI component 514 can include any suitable interface over which a human can exchange data with an electronic device (512). Although not depicted, it should be appreciated that query engine 512 can further receive the request from any suitable electronic entity, such as a server, database, or another query engine (e.g., a website search engine, a domain name server [DNS] query, and so on). It should also be appreciated that the electronic entity can be a network interface for the HMI component 514.

As a specific example, a response to a data request can comprise a number of users having at least a threshold interest in a subject (e.g., specified by the request). As another example, the response can include a number of users exhibiting at least the threshold interest in the subject over a period of time (e.g., for the last hour). As an additional example, the response can identify a cluster of user interest vectors pertinent to a subject(s) and a ranked occurrence value in the subject for each of the user interest vectors. As another example, the response can provide source or destination information of a cluster of user interest vectors, wherein each of the user interest vectors comprises a ranked occurrence value pertinent to the subject. Further, the response can include a time of day (or, e.g., time of week, month, year, etc.) that a greatest number of users have the greatest interest in a specified user interest, a time of day in which the occurrence value of a subject is updated substantially at a threshold update frequency, and so on.

It is to be appreciated that a response to a query provided by query engine 512 can include combinations of various user interest vector data. Accordingly, the subject disclosure is not limited by the specific examples articulated herein. Rather, any suitable statistical algorithm (e.g., means, average, confidence level, variance, continuous distribution, probability function, ratio, etc.) can be applied to subject matter information stored at user interest vector 502 to generate an output. Thus, system 500 can identify various suitable trends in user online interests, providing additional advantage to save cost or increase effectiveness with respect to targeted advertisement, marketing, etc.

Figure 6:
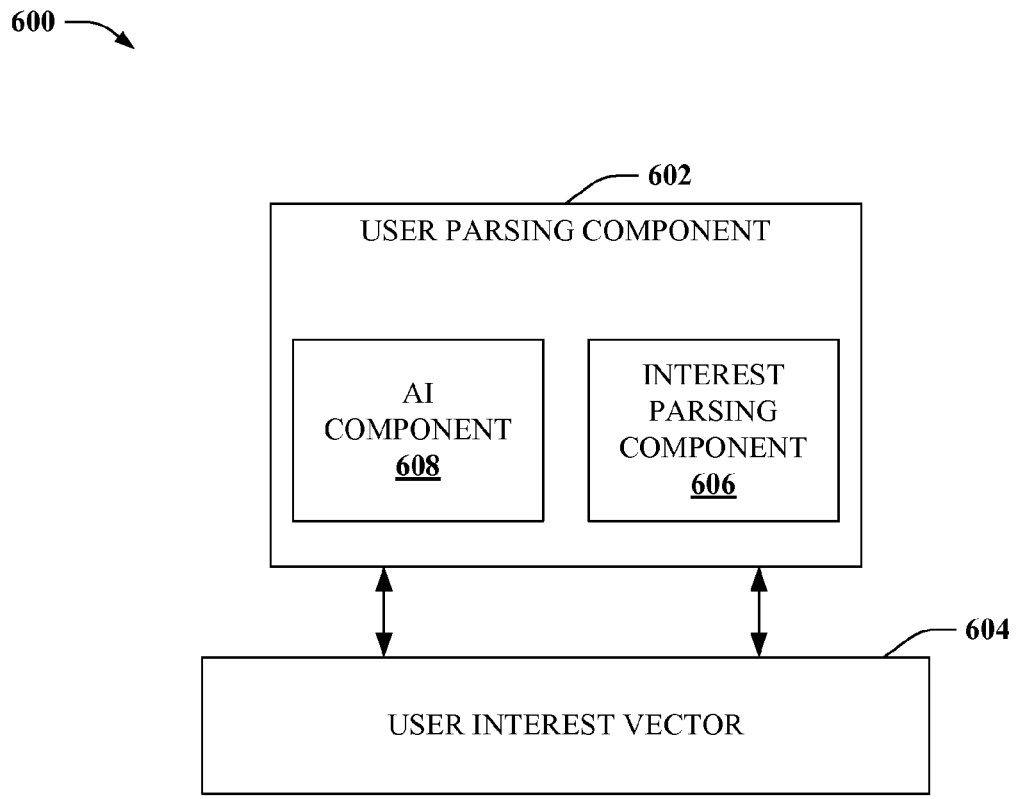
FIG. 6 depicts a block diagram of an example system that can employ machine learning to deconstruct interests of multiple users of a common device(s).

FIG. 6 depicts a block diagram of an example system 600 that can employ machine learning to deconstruct user interest vector data to determine multiple users of a common device(s). A data packet typically includes information to identify a networked device, but does not always contain information identifying a user(s) of the device. Consequently, inspecting data packets of a network device to determine user interests can lead to convoluted data comprised of interests of multiple individuals utilizing the device (e.g., a common home or office computer, a LAN routing device, network hub, or the like).

System 600 can include a user parsing component 602 that employs machine learning to separate one or more subjects of interest associated with a user interest vector 604 as a function of one or more potential device users. In some aspects, user parsing component 602 can include an interest parsing component 606. Interest parsing component 606 can analyze changes in data stored at user vector 604 over one or more threshold periods. For instance, counter values at various times can be analyzed and compared with previous or subsequent counter values at other times. Changes in subject matter activity at related points in time can indicate particular subjects or particular times when an individual user might be utilizing a network device.

In addition to the foregoing, interest parsing component 606 and user parsing component 602 can make subject matter and/or time-based assumptions to identify activity associated with an individual user. As an example, an assumption can be made that activity occurring at a common time(s) of day pertaining to a subject matter could pertain to the individual user. In another example, an assumption can be made that interests linked by a single data packet could pertain to the individual user. In still another example, an assumption can be made that multiple data packets pertaining to a single communication (e.g., a stream of packets addressed to and routed from common devices, optionally within a threshold period) can pertain to the individual user. Furthermore, an assumption can be made that activity pertaining to two or more subject matters and occurring within a threshold period (e.g., one minute, five minutes, 15 minutes, etc.) can be associated with the individual user.

It should be appreciation that interest parsing component 606 can utilize combinations of these or like assumptions, known in the art or made known to one of skill in the art by way of the examples provided herein, to associate identified subjects of interest with one or more users. Further, other suitable assumptions can be employed to distinguish users. Such assumptions can be based at least in part on relationships between subject matter(s), time(s) of day, corresponding device (e.g., a common online website) or like information determined from one or more data packets.

In addition to the foregoing, system 600 can include an AI component 608 that employs machine learning to decompose data within the user interest vector 604. Utilizing machine learning, AI component 608 can identify a number of potential users associated with such data. In some aspects, the AI component 608 can distinguish potential users based on correlations between subject matter activity, times associated with such activity, and other circumstances that relate data stored at the user interest vector 604.

AI component 608 employs machine learning to provide a dynamic and intelligent mechanism to group subject matter information in an interest vector 604, and identify interests of multiple potential users based in part on the grouped subject matter information. More specifically, AI component 608 can identify a number of potential users associated with a set of data. According to some aspects, AI component 608 can provide time-based statistics and related trends in subject matter activity to identify when a particular user most often engages in remote communication. According to still other aspects, by distinguishing users as a function of subject matter(s) of interest and/or time of interest, AI component can provide additional information to optimize receptivity of marketing or advertisement information addressed to a user. In additional aspects, AI component 608 can provide statistics, such as a confidence interval or the like, that report a measure of reliability for conclusions determined by AI component 608. Accordingly, a determination can be made whether to collect more data for an interest vector to increase statistical accuracy, as suitable.

To make strategic determinations AI component 608 can utilize a set of models (e.g., recipient preference model, input item history model, general MRU tag models of senders and/or recipients, etc.) in connection with determining relationships between subject matter data stored at user interest vector 604. The models can be based on a plurality of information (e.g., changes in subject matter activity, frequency of changes in activity, time of maximum, minimum or average activity, times of day, week, month, etc., correlations between subject matters, such as commonly assigned interest identifiers of two or more subject matters, relationships provided by information in common data packets, a common communication between devices, multiple communications between common devices, etc.). Optimization routines associated with AI component 608 can harness a model that is trained from previously collected data, a model that is based on a prior model that is updated with new data, via model mixture or a data mixing methodology, or simply one that is trained with seed data, and thereafter tuned in real-time by training with actual field data provided by user interest vector 604.

In addition, AI component 608 can employ learning and reasoning techniques in connection with making determinations or inferences regarding optimization decisions and the like. For example, AI component 608 can employ a probabilistic-based or statistical-based approach in connection with modifying or updating data structures or data configurations associated with user interest vector 604, or drawing conclusions there from. The inferences can be based in part upon explicit training of classifier(s) (not shown) before employing the AI component 608, or implicit training based at least upon manual input and the like. Data or policies used in optimizations can be collected from a specific database or from a community of databases (not depicted) of various types, various applications and/or operating systems, for instance.

AI component 608 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by one or more structure searches using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various aspects described herein. As a non-limiting example, classifiers can be trained on a relationship between data associated with a first subject matter and a second subject matter, as described herein. As data is updated at user interest vector 604, or additional data fields/subject matters are identified, the classifiers can be retrained. For instance, when additional data packets are examined by a packet inspection system (not depicted) to update the user interest vector(s) 604, AI component 608 can execute one or more classifiers to generate changes to inferences and results provided by the AI component 608.

Methodologies employed by AI component 608 can also include mechanisms for the capture of logical relationships such as theorem provers or more heuristic rule-based expert systems. Inferences derived from such learned or manually constructed models can be employed in optimization techniques, such as linear and non-linear programming, that seek to maximize some objective function. For example, manipulating data of user interest vector 604 to deconstruct such data and identify potential users associated therewith can be based on iterative interactions with the user input vector 604, common times at which particular subject matter activity occurs, common communications at which particular subject matter activity occurs, common data packets wherein particular subject matter activity occurs, and/or like factors suitable for data configuration optimization.

The aforementioned systems have been described with respect to interaction between several components. It should be appreciated that such systems and components can include those components or sub-components specified therein, some of the specified components or sub-components, and/or additional components. For example, a system could include analysis component 102, inspection component 104, interest compilation component 106, aggregation component 408, time stamp component 506, and user parsing component 602, or a different combination of these and other components. Sub-components could also be implemented as components communicatively coupled to other components rather than included within parent components. Additionally, it should be noted that one or more components could be combined into a single component providing aggregate functionality. For instance, inspection component 104 can include analysis component 102, or vice versa, to facilitate accessing a data packet to extract source or addressing information as well as match interest identifiers by way of a single component. The components can also interact with one or more other components not specifically described herein but known by those of skill in the art.

Furthermore, as will be appreciated, various portions of the disclosed systems and methods described herein may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 7:
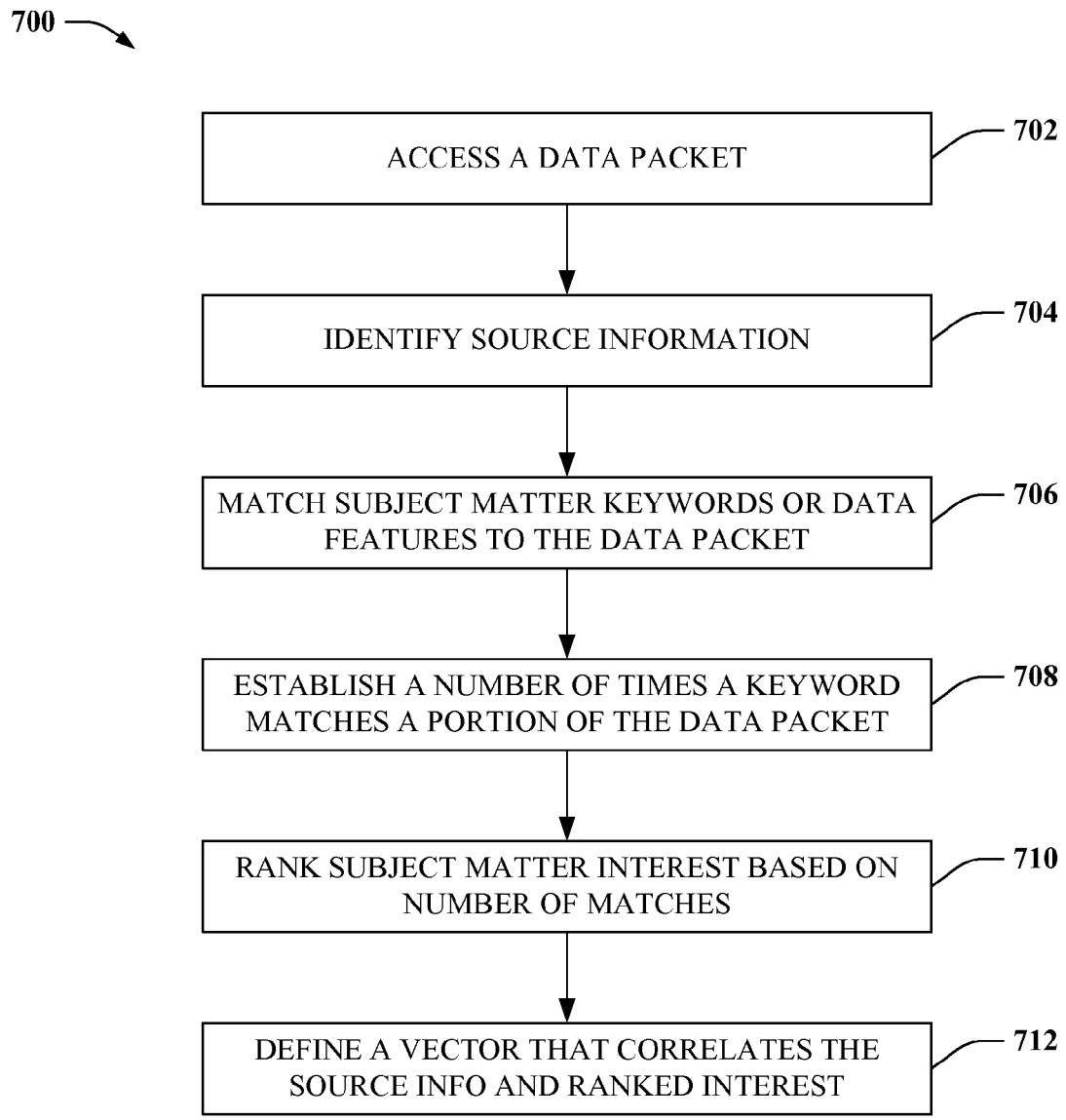
FIG. 7 illustrates a flowchart of a sample methodology for mining network traffic to determine user interests and provide value added services.
Figure 8:
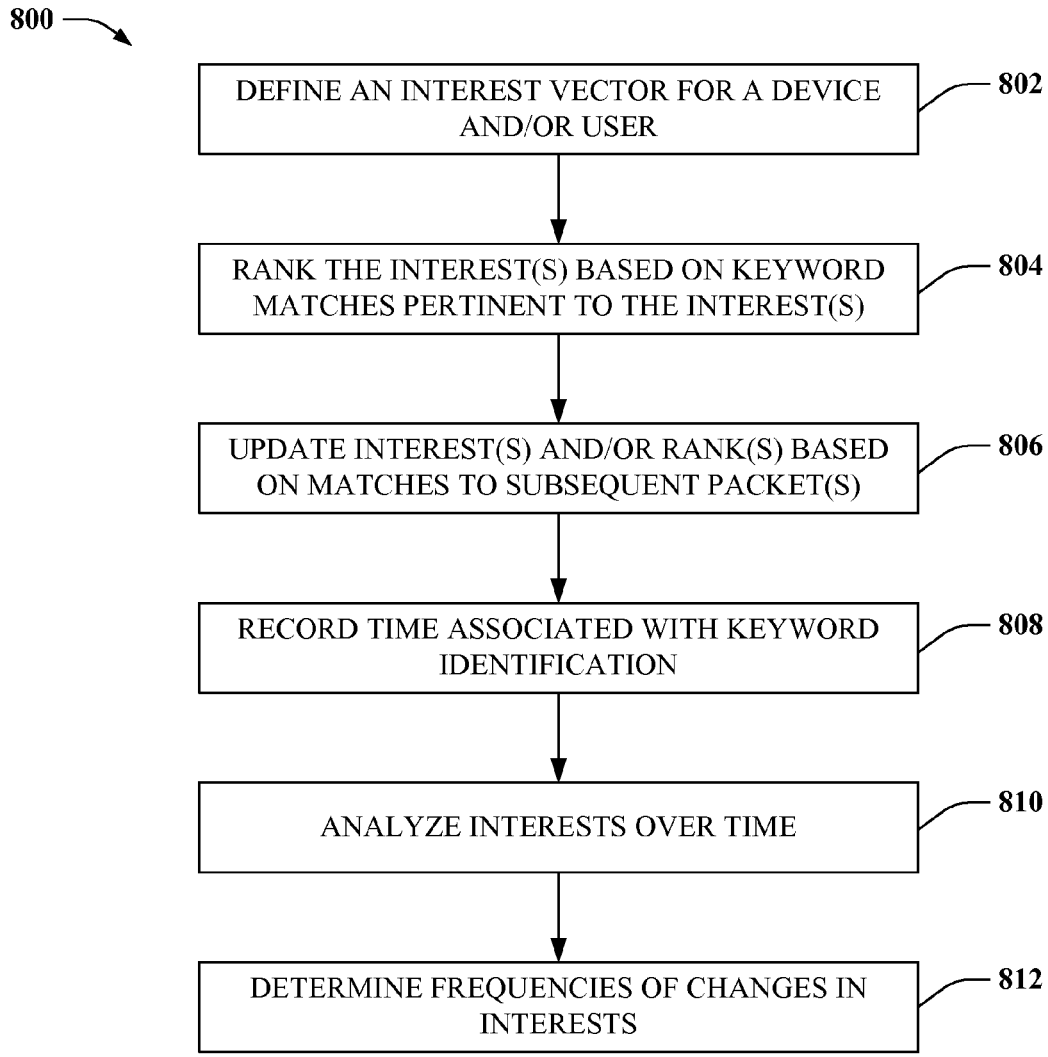
FIG. 8 depicts a flowchart of an example methodology for determining variations in user online interests as a function of time.
Figure 9:
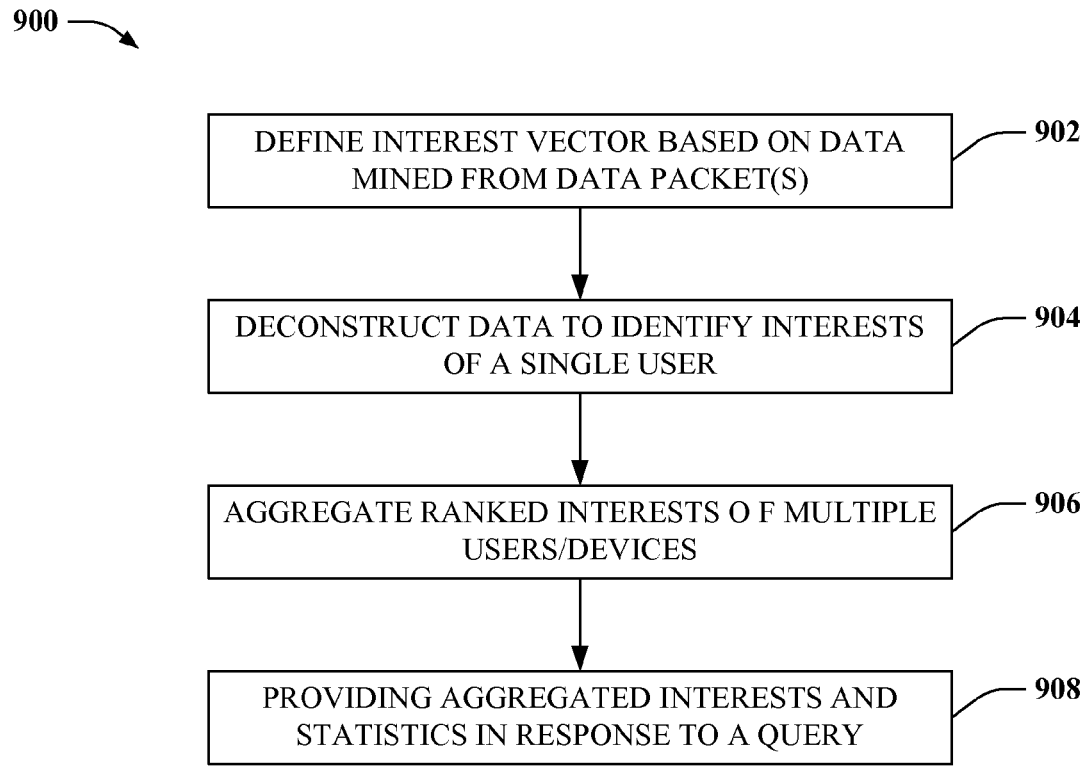
FIG. 9 illustrates a flowchart of a sample methodology for aggregating users into groups as a function of like online interests.

In view of the exemplary systems described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Moreover, not all illustrated blocks are necessarily required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, conductive carrier interface, or media.

FIG. 7 illustrates a flowchart of a sample methodology 700 for mining network traffic to determine user interests and provide value added services. At 702, method 700 can access a data packet at a network interface device. The network interface device can be any suitable network traffic related device. As a particular example, the interface device can be an edge device providing service to one or more end users of a network. As a more specific example, the network interface device can be a router, a switch, a hub, or a combination thereof or of the like.

The data packet can be directed toward a user device, a public or private server, a database, a cache memory, or other component device and/or endpoint device of a network. Access to the data packet can be related to different portions of the data packet. For instance, a header portion, a payload portion, or a tail portion, or a combination thereof, can be accessed.

At 704, method 700 can identify source or addressing information from the data packet. Source/addressing information can identify an initiating device (e.g., that generated or routed the data packet) and/or a recipient device. Such information can include an IP address, a MAC address, or like address suitable to identify a device on a network. The source and addressing information can be assigned to a user interest vector, and can be utilized to identify subsequent data packets associated with the device on the network.

At 706, method 700 can identify or match one or more interest identifiers (e.g., a subject matter keyword), assigned to a common subject matter, to data within the data packet. For instance, deep packet inspection can be employed to compare data within the data packet to the interest identifier(s). At 708, method 700 can establish a number of instances where one of the keywords matches at least a portion of data within the data packet. The number of matches can be associated with the subject matter of interest. In one example, the number of matches can be stored within subject matter data blocks of a user interest vector. Furthermore, the number of matches can be updated if additional matches are identified in additional data packets. Accordingly, statistical representation of a user's online interests can potentially be improved over time.

At 710, a relative interest in the subject matter of interest is ranked based on an established number of matches. For example, if five interest identifier matches pertinent to a first subject matter of interest are determined, the first subject matter of interest can be given a relative rank of five (or, e.g., a fraction or multiple thereof, or a ratio thereof based on matches of other subject matters of interest associated with a common user interest vector, or common subject matters of interest associated with different user interest vectors, or a combination thereof or of the like). This relative interest rank can be updated over time as additional data packets are received. Accordingly, the relative rank can be refined as additional data is obtained. Once the relative rank is established, a user interest vector can be defined at 712 to correlate the source or addressing information, the common subject and the ranked interest. The user vector can thus provide a reference to contemporaneous interest of a device user(s) in a particular subject of interest.

As described, method 700 can track network traffic associated with a network device at a network router, switch, or like device. Accordingly, a broad range of web traffic can be analyzed, based on various web related functions (e.g., search engine queries, DNS queries, search engine results, browsed links, viewed websites, information retrieved, articles retrieved, and so on). Method 700 therefore can provide user interest information based on a broad spectrum of user online traffic. Such information can be provided to commercial vendors, advertisers, marketers, and the like, to assist such entities in maximizing accuracy and value of targeted advertisements and the like.

FIG. 8 depicts a flowchart of an example methodology 800 for determining variations in user online interests as a function of time. At 802, a user interest vector is defined that includes subject matters of interest common to a networked device. The subject matters of interest can be identified by way of data packet inspection. Specifically, data packets associated with the networked device can be inspected to identify an occurrence of interest identifiers (e.g., keywords) assigned to the subject matters of interest, as described herein. At 804, a relative rank in each subject matter of interest is generated based on a number of times an interest identifier associated with each subject matter is matched to a data packet transmitted by or targeted at the networked device. For instance, if five instance identifiers associated with a first subject matter are identified within one or more such packet(s), and three keywords associated with a second subject matter are identified within such packet(s), a relative rank of five and three (or, e.g., a variation thereof) can be generated for the first and second subject matters, respectively.

At 806, method 800 can update subject matter interests associated with the user interest vector, and/or relative ranks of such interests, based on occurrences of instance identifiers in subsequent data packets. At 808, method 800 can record a time associated with identification of an instance identifier, or updating a relative rank of a subject matter of interest. At 810, method 800 can analyze subject matters of interest as a function of time. For instance, time of activity (e.g., identification of an instance of a keyword and/or updating a relative rank), frequency of activity or the like can be determined. Furthermore, additional instance identifiers can be associated with subject matters of interest that have a relatively high contemporaneous ranking, or associated with newly defined subject matters of interest (e.g., provided by a vendor, generated automatically based on analysis of existing subject matters of interest and current rankings thereof). Further, analysis of newly associated or newly defined instance identifiers/subject matters can be implemented once a relative rank is assigned to the new subject matters.

At 812, changes in activity frequency as a function of one or more time thresholds can be determined. For instance, the user interest vector information and time record(s) can be referenced to determine a period of day that corresponds with maximum frequency of activity. Such a period can also be compared over multiple days to identify time-based trends in activity. Alternatively, or in addition, other threshold periods (e.g., seconds, minutes, hours, weeks, years, etc.) can be analyzed, and comparisons with similar or different threshold periods can be accomplished. Accordingly, times of minimal/maximal/moderate interest can be identified by method 800.

FIG. 9 illustrates a flowchart of a sample methodology 900 for aggregating users into groups as a function of like online interests. At 902, method 900 can define a user interest vector containing subject matter information mined from data packets associated with a network device, as described herein. At 904, method 900 can deconstruct the information contained in the user interest vector and identify one or more subject matters of interest in such information likely to be originated by a single user of the networked device. As an example, machine learning, including heuristic analysis, trained classifiers, data models, and/or the like can be employed to deconstruct the information. Machine learning can utilize various relationships between data and make various statistical assumptions based on such data and relationships to deconstruct the information. As examples, relationships can include time and interest activity/frequency relationships, common data packet and subject matter correlations, common device communication and subject matter activity correlations, and so on.

At 908, method 900 can aggregate ranked subject matter interests associated with multiple user interest vectors. Aggregation can be based on relative ranking of the subject matters of interest, ratios of such rankings, or the like. For instance, a dominant subject matter of interest (e.g., having a highest relative ranking compared with other interest rankings of a common user interest vector) of one user interest vector can be grouped with like dominant interests of other user interest vectors as a function of common or similar subject matter. Accordingly, user interest vectors having a dominant interest associated with sports can be grouped together, other user interest vectors having a dominant interest in fashion can be grouped together, additional user interest vectors having a dominant interest in art and literature can be grouped together, and so forth.

It should be appreciated that aspects of the subject disclosure are not limited by the articulated subjects of interest provided herein; virtually any subject of interest, narrowly defined or broadly defined, can be applicable to one or more aspects. Furthermore, suitable relationships for categorizing user interest vectors are not limited to the examples provided herein. Various suitable organizations of user interest vector data, or information derived there from, can be included in the subject disclosure (e.g., an organization of information requested by a vendor query can be included in a response).

Figure 10:
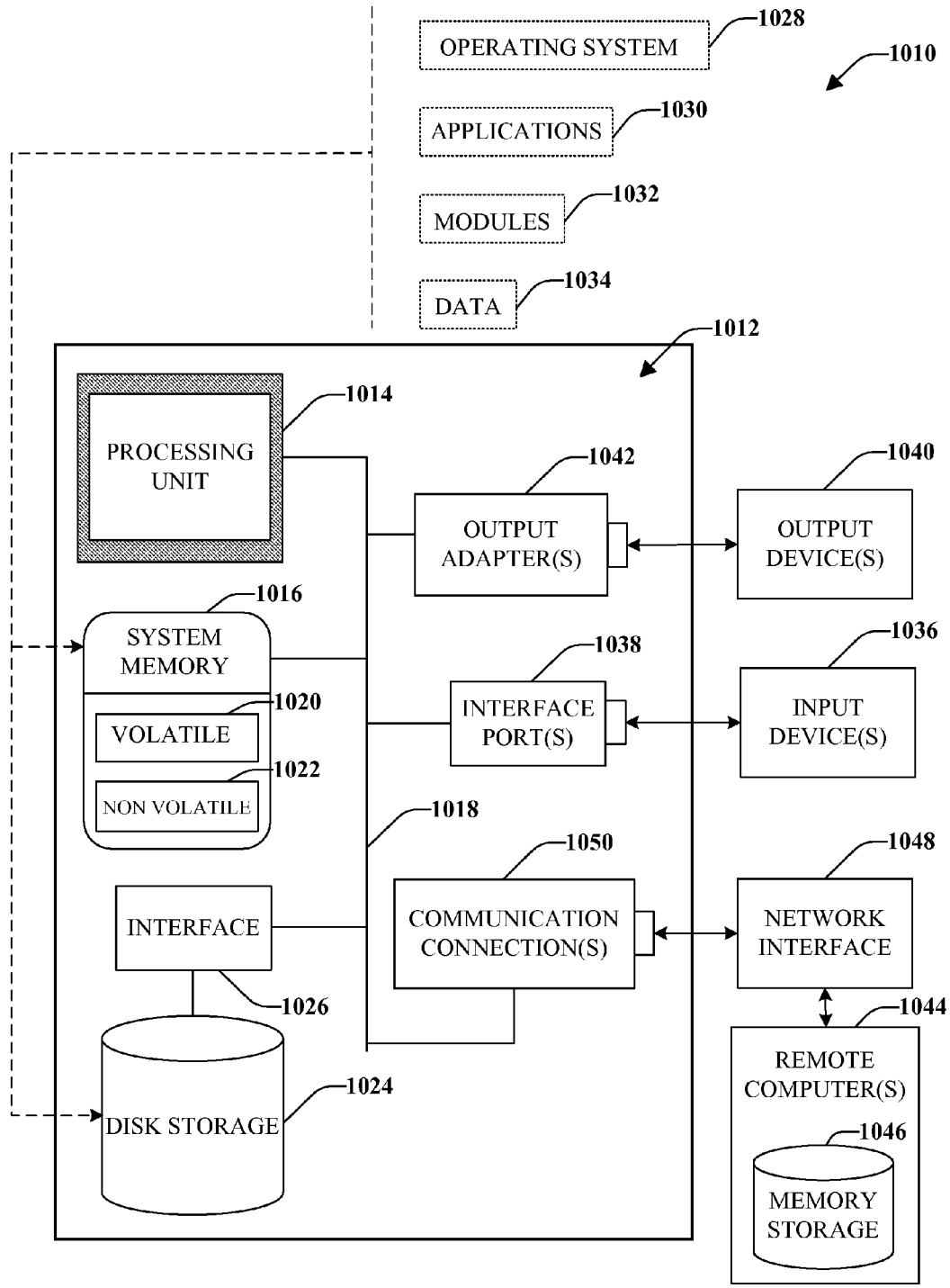
FIG. 10 depicts a block diagram of an example operating environment for implementing processing and statistical functions to implement various disclosed aspects.
Figure 11:
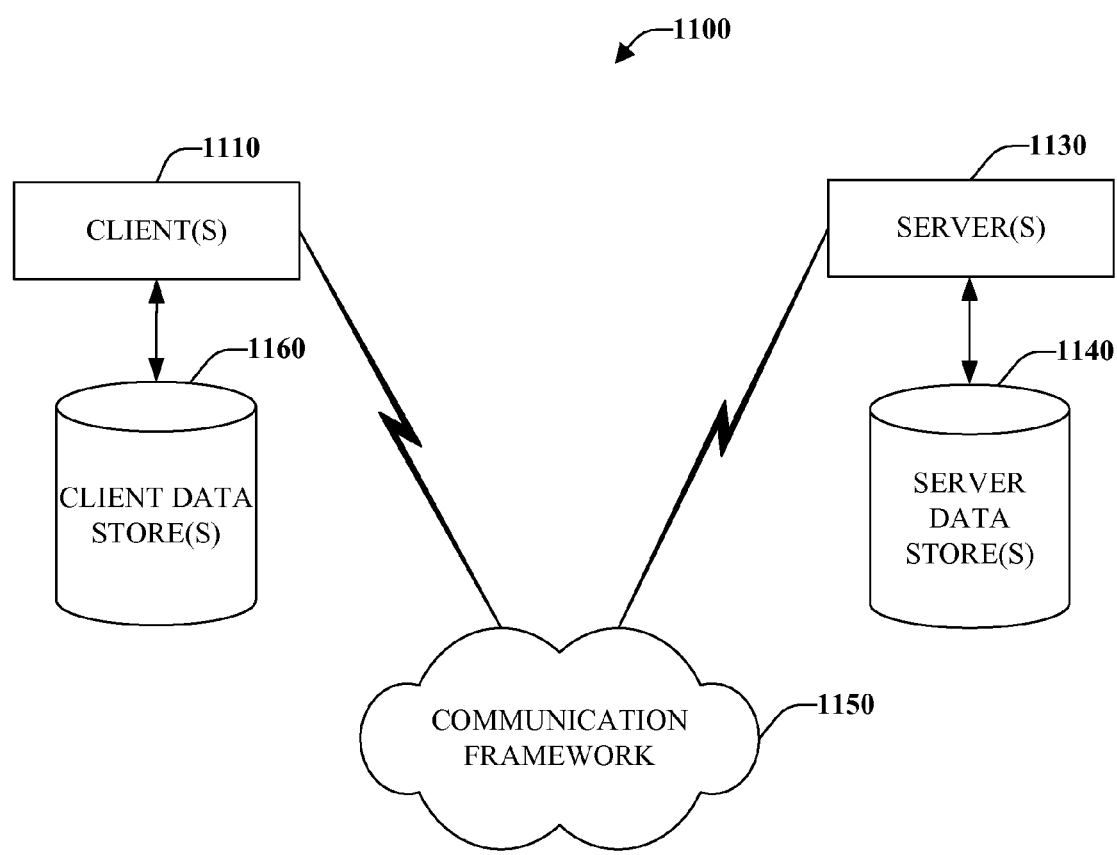
FIG. 11 illustrates a block diagram of an example networking environment for facilitating remote electronic communication in accordance with some aspects.

In order to provide additional context for various aspects of the disclosed subject matter, FIGS. 10 and 11, as well as the following discussion, are intended to provide a brief, general overview of a suitable environment in which various aspects of the disclosed subject matter can be implemented. For instance, logic and/or operational functions related to accessing data within a data packet, employing line rate packet inspection to mitigate hindrance of traffic throughput, identifying source and/or addressing information of a data packet, matching the source/addressing information to like data in subsequent packets, matching keywords to the data packet, updating subject matter counters based on matched keywords, implementing time-based statistics, implementing user vector correlations and classifications, as well as other aspects described herein can be implemented by one or more computer processing functions, described below. While the subject matter has been described herein in the general context of block diagrams and block components, those skilled in the art will recognize that various portions of the disclosed subject matter can also be implemented in combination with computer-executable instructions of a computer program, for instance that run on a computer and/or computers, other like program modules.

Generally, program modules include routines, programs, components, data structures, etc. that can perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant [PDA], phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices, described below.

With reference to FIG. 10, an example environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 can couple system components including, but not limited to, the system memory 1016 to the processing unit 1014. The processing unit 1014 can be any of various microprocessors, such as dual microprocessors, quad microprocessors, and other multiprocessor architectures suitable for a computer environment 1010.

The system bus 1018 can be any of several types of suitable bus structure(s) including the memory bus or memory controller, a peripheral bus or external bus, and/or a local bus using any suitable variety of available bus architectures including, but not limited to 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example, disk storage 1024. Disk storage 1024 includes, but is not limited to, devices such as a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in operating environment 1010. Such software can include an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user can enter commands or information into the computer 1012 through input device(s) 1036 (e.g., an input portion of an HMI device). Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 (e.g., an output portion of an HMI device) can utilize some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel and CRT), speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and can typically include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for example, internal and external technologies such as, modems including regular telephone grade modems, cable modems, power modems and DSL modems, ISDN adapters, and Ethernet cards or components.

FIG. 11 is a schematic block diagram of a sample-networking environment 1100 that can be utilized to provide remote electronic data exchange. For instance, data collection and/or statistical analysis performed at a network device can be provided to a remote networked device, for instance, in response to a query. The system 1100 includes one or more client(s) 1111. The client(s) 1111 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the present invention, for example. One possible communication between a client 1111 and a server 1130 may be in the form of a data packet adapted to be transmitted between two or more computer processes.

The system 1100 includes a communication framework 1150 that can be employed to facilitate communications between the client(s) 1111 and the server(s) 1130. The client(s) 1111 are operatively connected to one or more client data store(s) 1160 that can be employed to store information local to the client(s) 1111. Similarly, the server(s) 1130 are operatively connected to one or more server data store(s) 1140 that can be employed to store information local to the servers 1130.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method, comprising:
    obtaining source or destination information from a data packet flowing from a user device with an analysis component of a processing device;
    examining a payload of the data packet for one or more keywords;
    comparing data within the payload of the data packet to the one or more keywords, the keywords are associated with a common subject of interest;
    establishing a number of times in which one of the keywords matches at least a portion of the data;
    ranking an interest in the common subject in part based on the established number of matches;
    and
    defining, with an interest compilation component of the processing device, a user interest vector that correlates the source or destination information, the common subject and the ranked interest, and records a time stamp when the correlation occurs for the packet, the time stamp including an indication of a time when an occurrence value associated with the user interest vector is updated, enabling the tracking of a frequency of interest during a plurality of predetermined periods of time, the defining further including performing statistical analysis on time-based trends based on the time stamp and based on a time period selected subsequent to the recording of the time stamp.

2. The method of claim 1, further comprising comparing the common subject with respect to an additional subject of interest based in part on the ranking.

3. The method of claim 1, further comprising:
    accessing an additional data packet that comprises the identified source or addressing information;
    identifying instances in which one of the keywords matches a portion of data within the additional data packet; and
    updating the ranked interest based in part on a number of times that one of the keywords is found within the additional data packet.

4. The method of claim 3, further comprising:
    recording a time when each match to data within the data packet is established;
    recording a time when each match to data within the additional data packet is identified; and
    determining a change in the ranked interest as a function of at least one or more recorded times.

5. The method of claim 1, further comprising employing machine learning to decompose a user interest vector that contains a ranked interest for each of a plurality of subject matters.

6. The method of claim 5, further comprising identifying one or more of the plurality of subject matters that have a predetermined probability of being associated with a single user or device.

7. The method of claim 1, further comprising:
    aggregating ranked interests associated with multiple user interest vectors; and
    identifying a group of device users that share interest in the common subject based in part on the aggregation.

8. The method of claim 1, wherein the predetermined periods of time are times of year.

9. The method of claim 1, wherein the predetermined periods of time are times of day.

10. The method of claim 1, wherein the predetermined periods of time are days of the week.

11. The method of claim 1, further comprising: grouping device users together based on tracked frequencies of interests during shared predetermined periods of time.

12. A switch, comprising:
    an analysis component of a processing device that obtains source or destination information from a received data packet flowing from a user device;
    an inspection component of the processing device that examines a payload of a data packet and updates an occurrence value each time that an interest indicator is identified within the payload of the data packet, wherein the interest indicator is correlated with a subject, and time stamps the data packet to enable tracking of a frequency of interest during one particular period of time among a plurality of predetermined periods of time; and
    an interest compilation component of the processing device that defines a user interest vector having a user identity field and a user interest field, the user identity field includes the obtained source or destination information and the user interest field couples the subject with the updated occurrence value, and records a time stamp when the correlation occurs for the packet, the time stare stamp including an indication of a time when an occurrence value associated with the user interest vector is updated, enabling the tracking of a frequency of interest during the plurality of predetermined periods of time, the defining further including performing statistical analysis on time-based trends based on the time stamp and based on a time period selected subsequent to the recording of the time stamp.

13. The switch of claim 12, further comprising an interest categorization component that ranks the subject based at least on the updated occurrence value.

14. The switch of claim 12, further comprising an aggregation component that clusters the user interest vector with at least one additional user interest vector based in part on the updated occurrence value.

15. The switch of claim 12, further comprising a reference component that compiles a list of synonyms pertinent to the interest indicator, the inspection component updates the occurrence value each time the interest indicator matches an entry in the list of synonyms.

16. The switch of claim 12, further comprising a time stamp component that records an update time for each instance that the inspection component updates the occurrence value.

17. The switch of claim 16, further comprising an interest monitoring component that determines a frequency with which the occurrence value is updated and ascertains a degree of interest based in part on the determined update frequency.

18. The switch of claim 17, further comprising an interest evolution component that analyzes changes in the determined update frequency, the interest monitoring component employs the analyzed changes in part to ascertain the degree of interest.

19. The switch of claim 12, further comprising a query engine that receives a request for data, inspects the user interest vector for the requested data and provides a response to the request.

20. The switch of claim 19, wherein the requested data includes at least one of:
   a number of users having at least a threshold interest in the subject;
   a number of users having at least the threshold interest in the subject during a period of time;
   source or destination information of a cluster of user interest vectors, wherein each of the cluster of user interest vectors comprises a ranked occurrence value pertinent to the subject; or
   a time of day in which the occurrence value is updated substantially at a threshold update frequency.

21. The switch of claim 12, wherein the inspection component compares the interest indicator to data within the data packet by employing substantially line rate deep packet inspection.

22. The switch of claim 12, wherein:
   the interest compilation component defines the user interest vector to have a user interest field for each of a plurality of subjects of interest;
   the inspection component compares the data packet to at least one interest indicator correlated with each of the plurality of subjects of interest; and
   the inspection component updates an interest counter associated with a particular subject of interest when an interest indicator correlated with the particular subject of interest matches data within the data packet.

23. The switch of claim 22, further comprising a user parsing component that employs machine learning to distinguish a subject of interest from the plurality of subjects of interest that is attributable to an individual user.

24. The switch of claim 22, further comprising an interest parsing component that analyzes changes in the user interest vector over a threshold period and identifies a dominant user based on a dominant or persistent subject of interest.

25. The switch of claim 22, further comprising an artificial intelligence component that decomposes data in the user interest vector and identifies a number of potential users associated with the data.

26. The switch of claim 12, wherein the interest compilation component generates at least one additional user interest vector during an established period of time, or is associated with one or more selected network devices.

* * * * *

UNITED STATES PATENT AND TRADEMARK OFFICE
CERTIFICATE OF CORRECTION

PATENT NO. : 8,504,488 B2  
APPLICATION NO. : 12/112456  
DATED : August 6, 2013  
INVENTOR(S) : Dutta et al.

Page 1 of 1

It is certified that error appears in the above-identified patent and that said Letters Patent is hereby corrected as shown below:

In the Claims

In column 25, line 41-42, claim 1, delete "matches;¶ and" and insert --matches; and--, therefor In column 26, line 51, claim 12, after "time", delete "stare", therefor Signed and Sealed this  
Twenty-fourth Day of December, 2013

Margaret A. Focarino  
*Commissioner for Patents of the United States Patent and Trademark Office*